(12) United States Patent
Royer (10) Patent No.: US 8,641,123 B1
(45) Date of Patent: Feb. 4, 2014

(54) SYSTEM FOR COVERING A VEHICLE PLATFORM

(71) Applicant: Real Royer, Saint-Hyacinthe (CA)

(72) Inventor: Real Royer, Saint-Hyacinthe (CA)

( * ) Notice: Subject to any disclaimer, the term of this patent is extended or adjusted under 35 U.S.C. 154(b) by 0 days.

(21) Appl. No.: 13/788,141

(22) Filed: Mar. 7, 2013

(51) Int. Cl.
*B60P 7/04* (2006.01)

(52) U.S. Cl.
USPC ........................................ 296/98; 296/100.11

(58) Field of Classification Search
USPC ................ 296/98, 100.11, 100.12, 100.13, 296/100.14, 100.15, 100.16, 100.17
See application file for complete search history.

(56) References Cited

U.S. PATENT DOCUMENTS

| | | | |
|---|---|---|---|
| 473,292 A | 4/1892 | Campbell et al. |
| 1,318,820 A | 10/1919 | Watkins |
| 1,784,248 A | 12/1930 | Nolen et al. |
| 1,786,048 A | 12/1930 | Williams |
| 2,562,300 A | 7/1951 | Dingman |
| 2,976,082 A | 3/1961 | Dahlman |
| 3,384,413 A | 5/1968 | Sargent |
| 3,423,126 A | 1/1969 | Galvin et al. |
| 3,785,694 A | 1/1974 | Sargent |
| 3,829,154 A | 8/1974 | Becknell |
| 4,212,492 A | 7/1980 | Johnsen |
| 4,225,175 A | 9/1980 | Fredin |
| 4,234,224 A | 11/1980 | Rosenvold |
| 4,302,043 A | 11/1981 | Dimmer et al. |
| 4,380,350 A | 4/1983 | Block |
| 4,484,777 A | 11/1984 | Michel |
| 4,505,512 A | 3/1985 | Schmeichel et al. |
| 4,518,193 A | 5/1985 | Heider et al. |
| 4,529,098 A | 7/1985 | Heider et al. |
| 4,657,062 A | 4/1987 | Tuerk |
| 4,659,134 A | 4/1987 | Johnson |
| 4,673,208 A | 6/1987 | Tsukamoto |
| 4,691,957 A | 9/1987 | Ellingson |
| 4,700,985 A | 10/1987 | Whitehead |
| 4,834,445 A | 5/1989 | Odegaard |
| 4,915,439 A | 4/1990 | Cramaro |
| 4,987,942 A | 1/1991 | Eriksson |
| 4,991,901 A | 2/1991 | Meekhof, Sr. et al. |
| 5,002,328 A | 3/1991 | Michel |
| 5,050,923 A | 9/1991 | Petelka |
| 5,180,203 A | 1/1993 | Goudy |
| 5,186,231 A | 2/1993 | Lewis |
| 5,328,228 A | 7/1994 | Klassen |
| 5,429,403 A | 7/1995 | Brasher |
| 5,466,030 A | 11/1995 | Harris et al. |
| 5,549,347 A | 8/1996 | Anderson |
| 5,658,037 A | 8/1997 | Evans et al. |
| 5,762,002 A | 6/1998 | Dahlin et al. |
| 5,765,901 A | 6/1998 | Wilkens |
| 5,823,067 A | 10/1998 | Clarys et al. |

(Continued)

*Primary Examiner* — Joseph Pape (57) ABSTRACT

A system for covering a vehicle platform defining opposed ends. End elements are mountable to the vehicle platform adjacent its ends and a tarpaulin attachment element extends therebetween. A tarpaulin defines a tarpaulin movable end and a tarpaulin fixed portion extending in a parallel and spaced apart relationship relative to each other, the tarpaulin fixed portion being secured to the tarpaulin attachment element. An end rod is mounted to the tarpaulin adjacent the tarpaulin movable end and a support member is mounted to the tarpaulin a location intermediate the tarpaulin fixed portion and movable end. An actuator moves the tarpaulin between tarpaulin retracted and extended configurations. In the tarpaulin retracted configuration, at least part of the tarpaulin is wound around the end rod. In the tarpaulin extended configuration, the tarpaulin is unwound from the end rod and extends along the end elements, the support member abutting against the end elements.

19 Claims, 6 Drawing Sheets

(56) References Cited

U.S. PATENT DOCUMENTS

| | | |
|---|---|---|
| 5,911,467 A | 6/1999 | Evans et al. |
| 5,924,758 A | 7/1999 | Dimmer et al. |
| 6,135,534 A | 10/2000 | Schmeichel |
| 6,142,553 A | 11/2000 | Bodecker |
| 6,199,935 B1 | 3/2001 | Waltz et al. |
| 6,206,449 B1 | 3/2001 | Searfoss |
| 6,322,041 B1 | 11/2001 | Schmeichel |
| 6,361,100 B1 | 3/2002 | Koester |
| 6,478,361 B1 | 11/2002 | Wood |
| 6,513,856 B1 | 2/2003 | Swanson et al. |
| 6,527,331 B2 | 3/2003 | Searfoss |
| 6,595,594 B2 | 7/2003 | Royer |
| 6,715,817 B2 | 4/2004 | Nolan et al. |
| 6,779,828 B1 | 8/2004 | Poyntz |
| 6,783,168 B2 | 8/2004 | Searfoss |
| 6,805,395 B2 | 10/2004 | Royer |
| 6,886,879 B2 | 5/2005 | Nolan et al. |
| 6,926,337 B2 | 8/2005 | Poyntz |
| 7,189,042 B1 * | 3/2007 | Schmit .......................... 410/100 |
| 8,177,284 B1 * | 5/2012 | Royer ............................. 296/98 |
| 2002/0021018 A1 | 2/2002 | Royer |
| 2002/0043816 A1 | 4/2002 | Johnston |

* cited by examiner

SYSTEM FOR COVERING A VEHICLE PLATFORM

FIELD OF THE INVENTION

The present invention relates generally to the field of transportation. More specifically, the present invention is concerned with a system for covering a vehicle platform.

BACKGROUND OF THE INVENTION

Many systems exist for covering apertures in cargo containers of vehicles. However, there is a specific type of vehicle for which covering is still typically made manually. Indeed, a common manner of protecting from the elements the cargo supported on a vehicle platform is to simply extend a tarpaulin over the cargo and secure the tarpaulin to the sides of the vehicle platform. However, this operation can be time-consuming. Also, depending on the shape of the load, undesirable aerodynamic loads and drag can be generated. Finally, the tarpaulin thus extended must be relatively taut, which can be unsuitable for some types of cargo. Loosely fitting the tarpaulin over the cargo also as some disadvantages as at high speed, the tarpaulin would then hit the cargo violently due to wind buffeting.

Against this background, there exists a need in the industry to provide a novel system for covering a vehicle platform.

An object of the present invention is therefore to provide a system for covering a vehicle platform.

SUMMARY OF THE INVENTION

In a first broad aspect, the invention provides a system for covering at least part of a vehicle platform, the vehicle platform defining a platform first end and a substantially opposed platform second end. The system includes a first end element mountable to the vehicle platform so as to extend substantially upwardly from the vehicle platform substantially adjacent the platform first end, the first end element defining a first end element peripheral edge; a second end element mountable to the vehicle platform so as to extend substantially upwardly from the vehicle platform substantially adjacent the platform second end, the second end element defining a second end element peripheral edge; a tarpaulin attachment element extending between the first and second end elements; a tarpaulin, the tarpaulin defining a tarpaulin movable end and a tarpaulin fixed portion extending in a substantially parallel and spaced apart relationship relative to each other, the tarpaulin also defining a pair of tarpaulin side edges extending between the tarpaulin fixed portion and movable end, the tarpaulin fixed portion being secured to the tarpaulin attachment element; an end rod mounted to the tarpaulin substantially adjacent the tarpaulin movable end and extending substantially parallel thereto; a support member extending substantially parallel to the end rod and mounted to the tarpaulin at a location intermediate the tarpaulin fixed portion and movable end; and an actuator operatively coupled to the end rod for selectively rolling the tarpaulin therearound end unrolling the tarpaulin therefrom, the actuator being operative for moving the tarpaulin between a tarpaulin retracted configuration and a tarpaulin extended configuration. In the tarpaulin retracted configuration, at least part of the tarpaulin is wound around the end rod and positioned adjacent the tarpaulin attachment element. In the tarpaulin extended configuration, the tarpaulin is unwound from the end rod and the tarpaulin side edges extend each along at least part of a respective one of the first and second end element peripheral edges with the support member abutting against the first and second end elements.

In some embodiments of the invention, the first end element peripheral edge defines a first edge first section extending from substantially adjacent the vehicle platform when the first end element is mounted to the vehicle platform in an operative configuration and a first edge second section extending from the first edge first section at an angle and laterally inwardly relative thereto. Also, the second end element peripheral edge defines a second edge first section extending from substantially adjacent the vehicle platform when the second end element is mounted to the vehicle platform in an operative configuration and a second edge second section extending from the second edge first section at an angle and laterally inwardly relative thereto. In the tarpaulin extended configuration, the support member abuts against the first and second end element peripheral edges respectively substantially adjacent a first merger of the first edge first and second sections and a second merger of the second edge first and second sections.

For example, the first and second edge first sections are substantially vertical.

In some embodiments of the invention, the support member protrudes from the tarpaulin side edges.

In some embodiments of the invention, the tarpaulin attachment element extends between the first and second end elements overhanging the vehicle platform substantially in a middle of the vehicle platform when mounted to the vehicle platform in an operative configuration.

In some embodiments of the invention, at least one attachment element support is mountable to the vehicle platform and to the tarpaulin attachment element for supporting the tarpaulin attachment element between the first and second end elements.

In some embodiments of the invention, at least one support arm is provided, the support arm defining an arm proximal end and a substantially opposed arm distal end, the support arm being movable between an arm retracted position and an arm extended position, wherein, with the system operatively mounted to the vehicle platform, in the arm extended position, the support arm extends laterally outwardly relative to the tarpaulin attachment element in an overhanging and substantially parallel relationship relative to the vehicle platform, the arm proximal end being substantially adjacent the tarpaulin attachment element, and, in the arm retracted position, the support arm is vertically pivoted relative to the arm extended position.

In some embodiments of the invention, an arm biasing element biases the support arm towards the arm retracted position.

In some embodiments of the invention, the arm biasing element exerts a biasing force on the support arm such that when the tarpaulin is in the tarpaulin extended configuration, the tarpaulin extends over the support arm and overcomes the biasing force so that the support arm achieves the arm extended position, and when the tarpaulin is in the tarpaulin retracted configuration, the biasing force moves the support arm to the arm retracted position.

For example, the support arm is pivotally mounted to the tarpaulin attachment element substantially adjacent the arm proximal end, the arm biasing element including a coil torsion spring mounted to the support arm and to the tarpaulin attachment element.

In some embodiments of the invention, the actuator includes an actuating arm and a motor, the actuating arm defining an actuating arm first end and an opposed actuating arm second end, the actuating arm being pivotally mounted to the first end element substantially adjacent the actuating arm first end, the motor being mounted to the actuating arm substantially adjacent the actuating arm second end and operatively coupled to the end rod to selectively rotate the end rod relative to the actuating arm.

In some embodiments of the invention, the actuating arm is articulated at a location intermediate the actuating arm first and second ends so as to allow the end rod to move along the first end element peripheral edge as the electric motor rotates the end rod to move the tarpaulin between the tarpaulin extended and retracted configurations.

In some embodiments of the invention, the tarpaulin attachment element extends between the first and second end elements overhanging the vehicle platform substantially in a middle of the vehicle platform when mounted to the vehicle platform in an operative configuration. Also, the tarpaulin defines an other tarpaulin movable end, the tarpaulin fixed portion being provided substantially midway between the tarpaulin movable ends. The system then further comprises an other end rod mounted to the tarpaulin substantially adjacent the other tarpaulin movable end and extending substantially parallel thereto; an other support member extending substantially parallel to the other end rod and mounted to the tarpaulin at a location intermediate the tarpaulin fixed portion and the other tarpaulin movable end; and an other actuator operatively coupled to the other end rod for selectively rolling part of the tarpaulin therearound end unrolling the tarpaulin therefrom.

In some embodiments of the invention, the system further comprises an end rod guide for guiding the end rod along the first end element peripheral edge as the tarpaulin is moved between the tarpaulin extended and retracted configurations. In some embodiments of the invention, the end rod defines an end rod end section protruding from one of the tarpaulin side edges, the end rod guide including a cable extending along at least a portion of the first end element peripheral edge and forming a loop around the end rod end section. For example, the end rod end section defines an end rod groove extending circumferentially therearound and receiving the loop thereinto.

In some embodiments of the invention, the end rod guide includes a tensioner operatively coupled to the cable for providing a tension in the cable.

In some embodiments of the invention, the tarpaulin defines a sleeve extending between the tarpaulin side edges, the support member being received in the sleeve.

In another broad aspect, the invention provides in combination, a vehicle platform and a system as described hereinabove for covering at least part of the vehicle platform, the vehicle platform defining a platform first end and a substantially opposed platform second end.

Advantageously, in some embodiments, the proposed system is relatively robust and relatively inexpensive to manufacture. Also, the proposed system is relatively easy to install to an existing vehicle platform and can be operated by a single user relatively easily.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 2, in a front cross-sectional view along section line II-II of FIG. 1, illustrates the system shown in FIG. 1;

FIG. 3, in a partial perspective view with parts removed, illustrates the system shown in FIGS. 1 and 2;

FIG. 6, in a front cross-sectional view along section line VI-VI of FIG. 5, illustrates the system shown in FIG. 5; and FIG. 7, in a side elevation view, illustrates a removable post part of the system shown in FIGS. 5 and 6.

DETAILED DESCRIPTION

Figure 1:
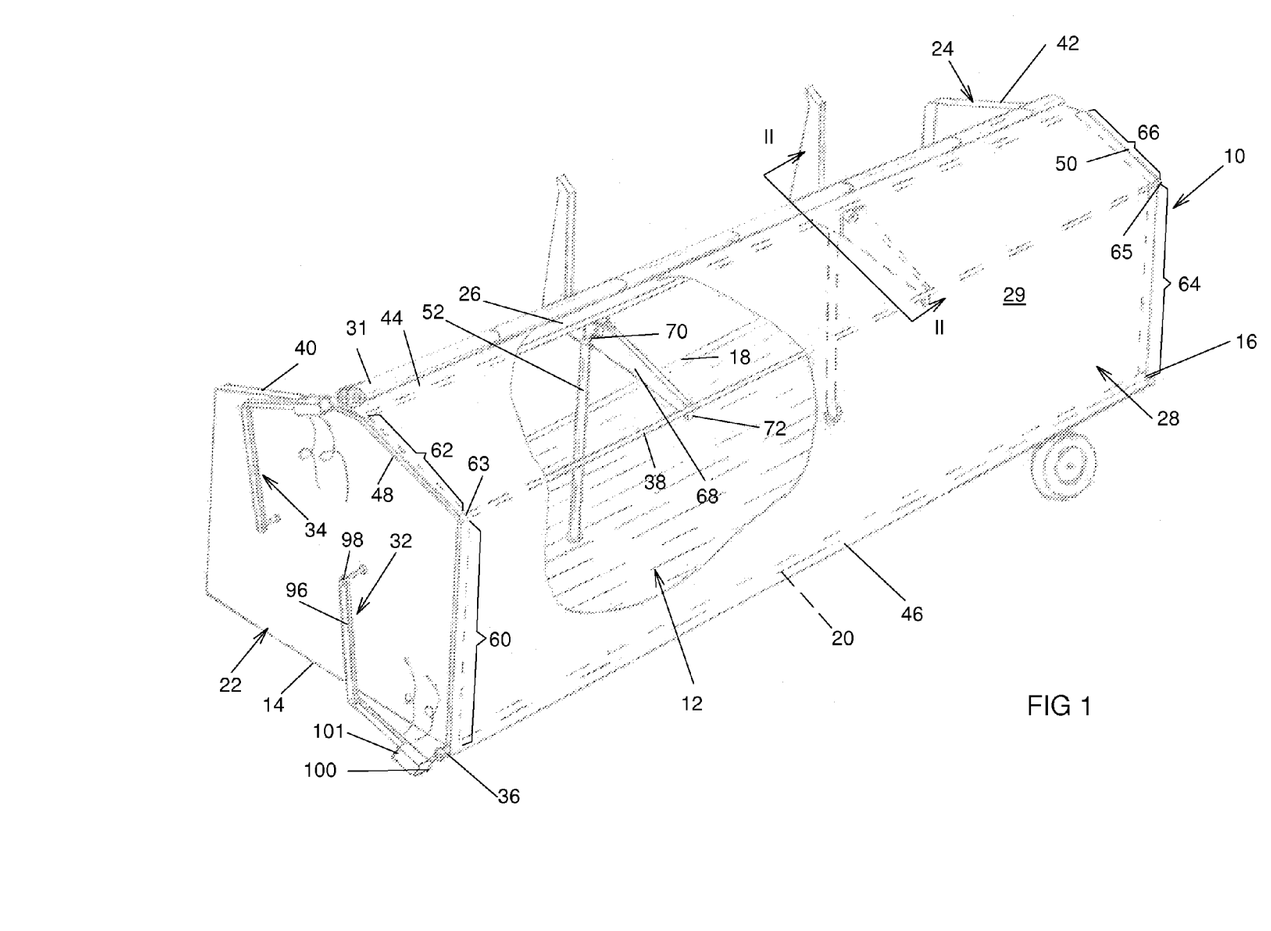
FIG. 1, in a perspective view, illustrates a system for covering at least part of a vehicle platform in accordance with an embodiment of the present invention, the system being shown mounted to the vehicle platform.

FIG. 1 illustrates a system 10 for covering at least part of a vehicle platform 12, the vehicle platform 12 defining a platform first end 14 and a substantially opposed platform second end 16. The platform also defines laterally opposed platform first and second side edges 18 and 20 extending between the platform first and second ends 14 and 16.

The terminology "substantially" is used in this document to denote variations in the thus qualified terms that have no significant effect on the principle of operation of the corresponding elements. These variations may be minor variations in design or variations due to mechanical tolerances in manufacturing and use of the proposed system 10. These variations and their effect on the operation of the proposed system 10 are to be seen with the eye of the reader skilled in the art.

Also, the term "vehicle platform" refers either to a platform integrally part of a vehicle, for example a platform truck, or a part of a trailer pulled by a motorized vehicle. The vehicle platform 12 may be a single physically delimited component, or can be only part of a larger element. In other words, for example, the vehicle platform 12 to be covered by the system 10 may be only part of a larger trailer.

The system 10 includes first and second end elements 22 and 24, a tarpaulin attachment element 26 and a tarpaulin 28 defining adjacent tarpaulin first and second sections 29 and 31, the junction of which is fixed to the tarpaulin attachment element 26. Actuators 32 and 34 are provided for actuating respectively the tarpaulin first and second sections 29 and 31. The system also includes for each of the tarpaulin first and second sections 29 and 31 an end rod 36 and support member 38.

The system 10 illustrated in the drawings includes a tarpaulin 28 defining the tarpaulin first and second sections 29 and 31 along with associated actuators 32 and 34, end rods 36 and support members 38. The tarpaulin first and second sections 29 and 31 and their associated components have similar structures and function and for clarity reasons, only the tarpaulin first section 29 and associated components are described hereinbelow in details, with the understanding that the tarpaulin second section 31 and associated components work in a similar manner. In the specific embodiment of the invention shown in the drawings, the tarpaulin first and second sections 29 and 31 and associated components are mirror images of each other. However, other possibilities are within the scope of the present invention. For example, in some embodiments of the invention, the tarpaulin 28 is movable along the entire peripheral edge of the first and second end elements 22 and 24 and does not therefore define the tarpaulin first and second sections 29 and 31. Also, in yet other embodiments of the invention, the tarpaulin first and second sections 29 and 31 are replaced by a pair of tarpaulins.

The first end element 22 is mounted to the vehicle platform 12 so as to extend substantially upwardly from the vehicle platform 12 substantially adjacent the platform first end 14. The first end element 22 may be vertical, or can extend upwardly at an angle relative to the vehicle platform 12. Typically, this angle is relatively small. Also, the first end element 22 may extend directly at the platform first end 14 or maybe provided slightly inwardly or outwardly relative to the platform first end 14. Typically, the first end element 22 take the form of a wall extending generally vertically from the vehicle platform 12.

The first end element 22 defines a first end element peripheral edge 40. In some embodiments of the invention, the first end element peripheral edge 40 takes the form of a ledge extending generally perpendicular to the remainder of the first end element 22.

Similarly, the second end element 24 is mounted to the vehicle platform 12 so as to extend substantially upwardly from the vehicle platform 12 substantially adjacent the platform second end 16 and defines a second end element peripheral edge 42.

The tarpaulin attachment element 26 extends between the first and second end elements 22 and 24. The terminology "extending between" means that the tarpaulin attachment element 26 is located relative to the vehicle platform 12 at a location between the first and second end elements 22 and 24. The tarpaulin attachment element 26 may contact the first and second end elements 22 and 24, or can be distanced therefrom. Typically, the tarpaulin attachment element 26 overhangs the vehicle platform 12 substantially in a middle of the vehicle platform 12, midway between the platform side edges 18 and 20. The tarpaulin attachment element 26 may be provided in register with, slightly below, or slightly above the first and second end element peripheral edges 40 and 42 when mounted to the vehicle platform in an operative configuration. In alternative embodiments of the invention, the tarpaulin attachment element 26 may be provided at other locations, for example adjacent the platform side edges 18 and 20 of the vehicle platform 12.

The tarpaulin first portion 29 defines a tarpaulin movable end 46 and a tarpaulin fixed portion 44 extending in a substantially parallel and spaced apart relationship relative to each other. The tarpaulin first portion 29 also defines a pair of tarpaulin side edges 48 and 50 extending between the tarpaulin fixed portion and movable end 44 and 46, the tarpaulin fixed portion 44 being secured to the tarpaulin attachment element 26. One of the end rod 36 is mounted to the tarpaulin 28 substantially adjacent the tarpaulin movable end 46 and extends substantially parallel thereto. One of the support member 38 extends substantially parallel to the end rod 36 and is mounted to the tarpaulin 28 at a location intermediate the tarpaulin fixed portion and movable end 44 and 46.

The actuator 32 is operatively coupled to the end rod 36 for selectively rolling the tarpaulin 28 therearound end unrolling the tarpaulin 28 therefrom, the actuator 32 being operative for moving the tarpaulin 28 between a tarpaulin retracted configuration and a tarpaulin extended configuration. In the tarpaulin retracted configuration, at least part of the tarpaulin 28 is wound around the end rod 36 and positioned adjacent the tarpaulin attachment element 26. In the tarpaulin extended configuration, the tarpaulin 28 is unwound from the end rod 36 and the tarpaulin side edges 48 and 50 extend each along at least part of a respective one of the first and second end element peripheral edges 40 and 42 with the support member 38 abutting against the first and second end elements 22 and 24.

The tarpaulin attachment element 26 takes the form of a substantially elongated platform secured at both ends thereof to a respective one of the first and second end elements 22 and 24. In some embodiments of the invention, at least one attachment element support 52 is mounted to the vehicle platform 12 and to the tarpaulin attachment element 26 for supporting the tarpaulin attachment element 26 between the first and second end elements 22 and 24. For example, the attachment element support 52 takes the form of a post extending between the vehicle platform 12 and the tarpaulin attachment element 26.

The tarpaulin 28 is dimensioned so as to cover the sides and the top of the space defined between the first and second end elements 22 and 24 when in the tarpaulins extended configuration. The tarpaulin 28 is solidly secured to the tarpaulin attachment element 26 in the tarpaulin fixed portion 44, for example using a bolt extending therethrough and secured to the tarpaulin attachment element 26.

Figure 4:
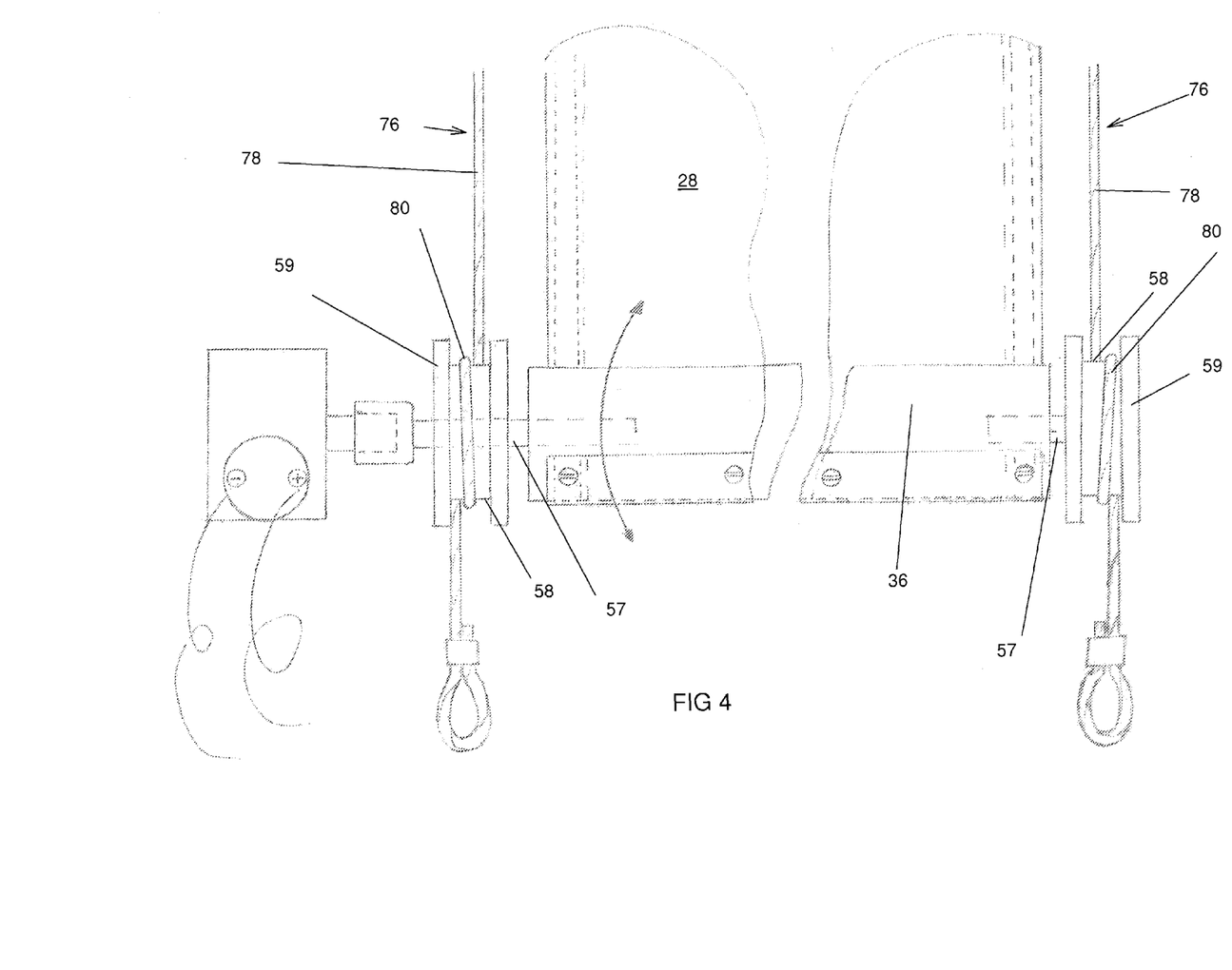
FIG. 4, in a partial side elevation view with parts removed, illustrates an end rod guide part of the system shown in FIGS. 1 to 4.

The tarpaulin movable ends 46 are each secured to an end rod 36, for example using rivets, as seen in in FIG. 4, so as to be rolled therearound or unrolled therefrom when the end rod 36 is rotated. The tarpaulin 28 defines a pair of sleeves 56 extending therealong between the tarpaulin side edges 48 and 50 and located between the tarpaulin fixed portion 44 and a respective one of the tarpaulin movable ends 46. The support members 38 are each received in a respective one of the sleeves 56. Typically, the end rods 36 and support members 38 protrude from the tarpaulin side edges 48 and 50.

Referring to FIG. 4, in some embodiments of the invention, the end rods 36 each define a pair of end rod end sections 57 each protruding from one of the tarpaulin side edges 48 and 50. Each end rod end section 57 defines an end rod groove 58 extending circumferentially therearound, the purpose of which is detailed hereinbelow. For example, the end rod grooves 58 are provided by a respective pulley 59 secured to the remainder of the end rod 36 and rotatable jointly therewith by the actuator 32.

Referring to FIG. 1, the first end element peripheral edge 40 defines a first edge first section 60 extending from substantially adjacent the vehicle platform 12 and a first edge second section 62 extending from the first edge first section 60 at an angle and laterally inwardly relative thereto. The second end element peripheral edge also defines a second edge first section 64 extending from substantially adjacent the vehicle platform 12 and a second edge second section 66 extending from the second edge first section 64 at an angle and laterally inwardly relative thereto. The support member 38 of the tarpaulin first portion 29 abuts against the first and second end element peripheral edges 40 and 42 respectively adjacent a first merger 63 of the first edge first and second sections 60 and 62 and a second merger 65 of the second edge first and second sections 64 and 66. The first and second end elements 22 and 24 provide a similar structure in the first and second end element peripheral edges 40 and 42 to support the tarpaulin second section 31.

Typically, the first and second edge first sections 60 and 64 are substantially vertical and the first and second edge second sections 62 and 66 are substantially horizontal or angled with the horizontal at a relatively small angle. The portion of the tarpaulin 28 that extend along the first and second edge first sections 60 and 64 therefore define a protective wall for the vehicle platform 12, while the portion of the tarpaulin 28 that extends along the first and second edge second sections 62 and 66 defines part of a protective roof for the vehicle platform 12.

Figure 2:
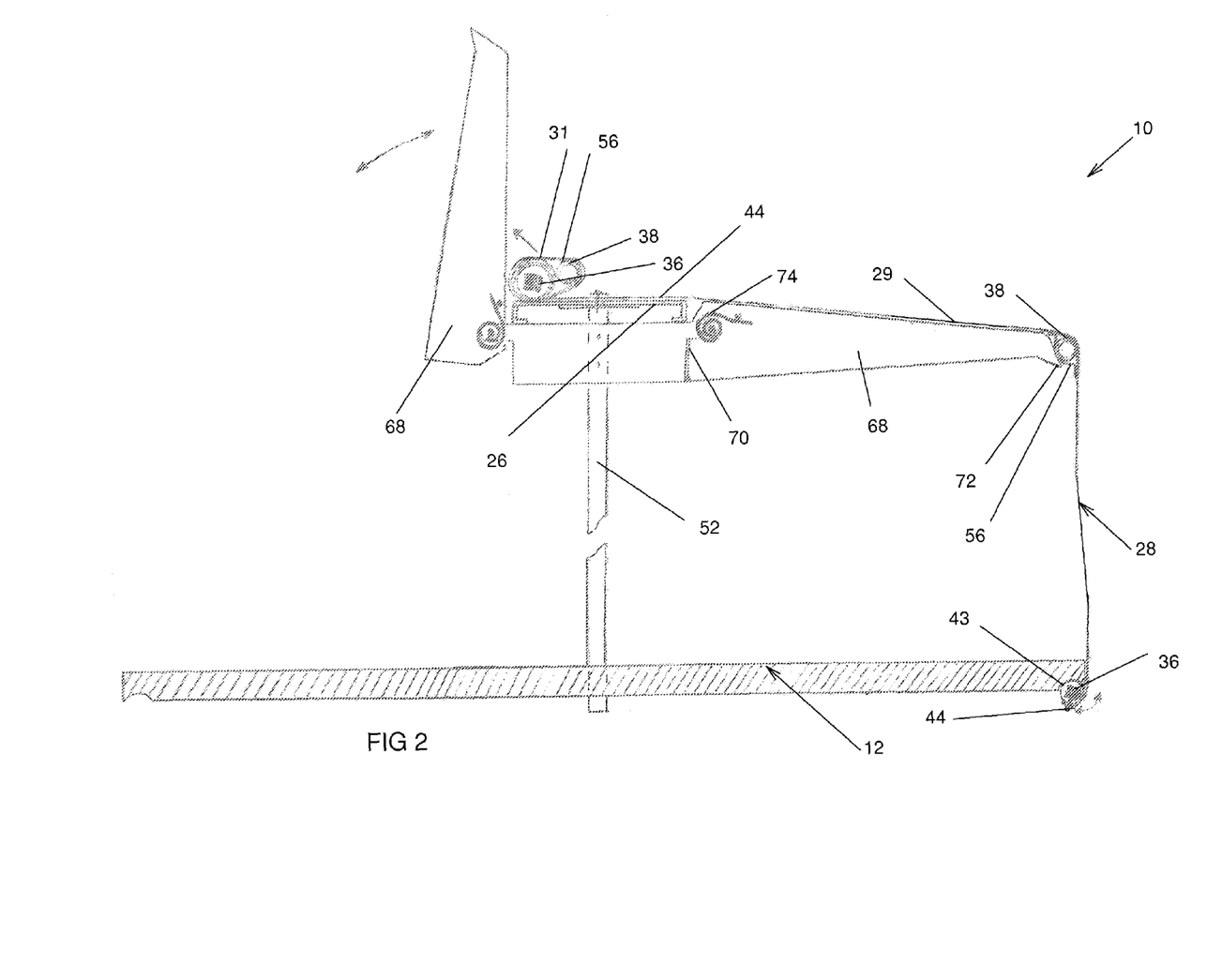

Referring to FIG. 2, in some embodiments of the invention, one or more support arms 68 are provided for supporting the tarpaulin 28 at locations intermediate the first and second end elements 22 and 24. In the embodiment of the invention shown in the drawings, four support arms 68 are present (only two of which are seen in FIG. 2), but any other suitable number of support arms 68 are possible. Each support arm 68 defines an arm proximal end 70 and a substantially opposed arm distal end 72. The support arms 68 are movable between an arm retracted position (seen for the support arm 68 not covered by the tarpaulin 28 in FIG. 2) and an arm extended position (seen for the support arm 68 covered by the tarpaulin 28 in FIG. 2). In the arm extended position, the support arms 68 extend laterally outwardly relative to the tarpaulin attachment element 26 in an overhanging and substantially parallel relationship relative to the vehicle platform 12, the arm proximal end 70 being substantially adjacent the tarpaulin attachment element 26. Also, the support member 38 abuts against the extended support arms 68 substantially adjacent the arm distal ends 72. In the arm retracted position, the support arms 68 are vertically pivoted relative to the arm extended position. Pivotal movement between the arm extended and retracted positions can be caused by an arm biasing element 74, as described in further details hereinbelow, of can be caused by a motor or hydraulic cylinder controlled by an intended user of the system 10, among other possibilities.

The arm biasing element 74 is provided for biasing the support arm 68 towards the arm retracted position. Typically, the arm biasing element 74 exerts a biasing force on the support arms 68 such that when the tarpaulin 28 is in the tarpaulin extended configuration, the tarpaulin 28 extends over the support arm 68 and overcomes the biasing force so that the support arms 68 achieve the arm extended position. When the tarpaulin 28 is in the tarpaulin retracted configuration, the biasing force moves the support arms 68 to the arm retracted position.

In the specific embodiment of the invention shown in the drawings, the support arms 68 are each pivotally mounted to the tarpaulin attachment element 26 substantially adjacent the arm proximal end 70 and the arm biasing element 74 takes the form of a coil torsion spring mounted to the support arm 68 and to the tarpaulin attachment element 26. However, other possibilities are within the scope of the invention.

In some embodiments of the invention, the vehicle platform 12 defines a recess 43 extending along each of the platform side edges 18 and 20, on the underside thereof, for receiving the end rods 36 when the tarpaulin 28 is in the tarpaulin extended configuration.

Figure 3:
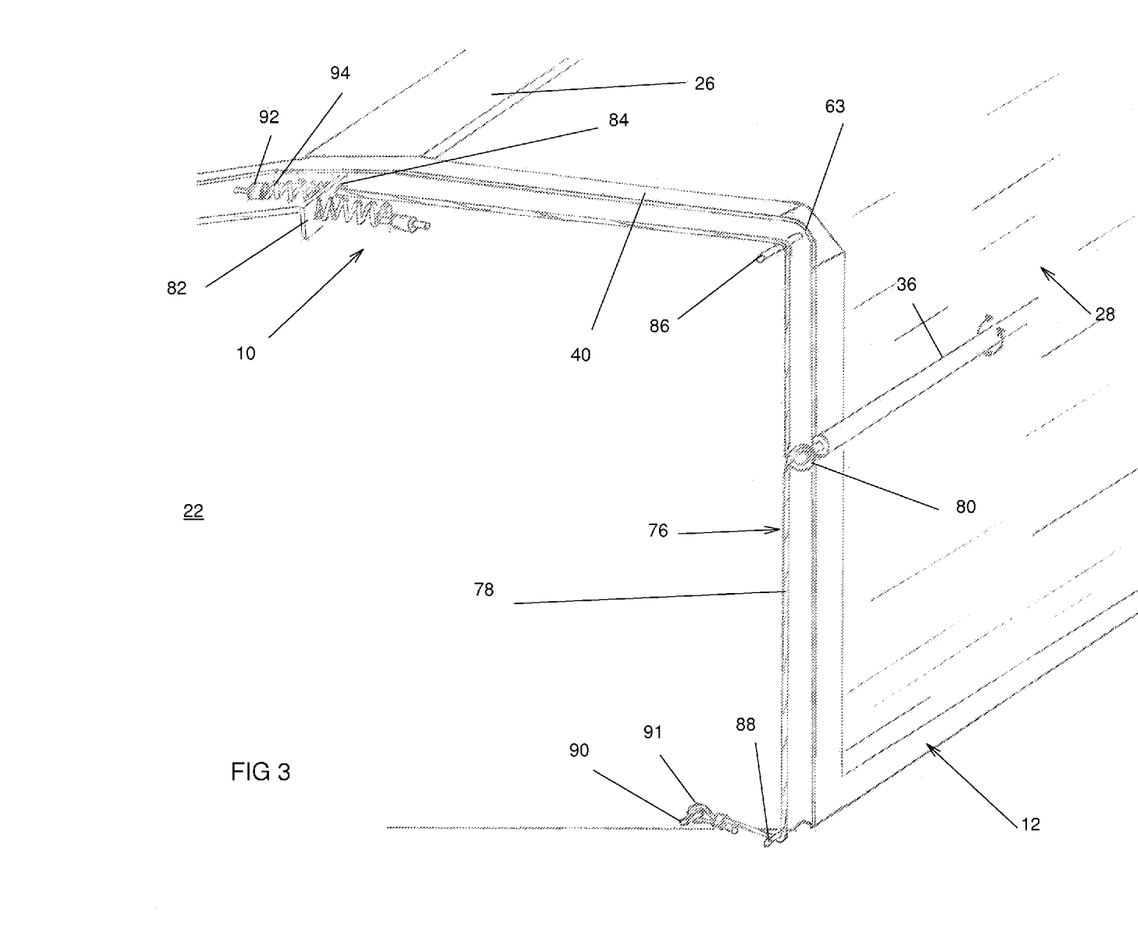

In some embodiments of the invention, the system 10 also includes end rod guides 76, better seen in FIG. 3 and omitted from FIG. 1 for clarity reasons, for guiding the end rod 36 as the tarpaulin 28 is moved between the tarpaulin extended and retracted configurations. An end rod guide 76 is provided for each end of each of the end rods 36. While other manners of guiding the end rods 36 are possible, an end rod guide 76 as illustrated in FIG. 3 has been found advantageous in many cases.

The end rod guide 76 includes a cable 78 extending along at least a portion of the first end element peripheral edge 40 and forming a loop 80 around the end rod 36. The loop 80 is received in the end rod groove 58, as seen in FIG. 4. Returning to FIG. 3, one of the end rod guide 76 is now described in further details. The other end rod guides 76 have a similar structure and are suitably positioned relative to the first and second end elements 22 and 24 to perform their function. A mounting plate 82 defining a mounting aperture 84 is provided on the first end element 22 adjacent the tarpaulin attachment element 26. Guiding rods 86 and 88 are provided also on the first end element 22 adjacent the first merger 63 of the first edge first and second sections 60 and 62 and adjacent the vehicle platform 12. The guiding rods 86 and 88 extend perpendicularly to first end element 22. Finally, a cable attachment 90 is provided adjacent the vehicle platform 12, laterally inwardly relative to the guiding rod 88.

The cable 78 is secured to the mounting plate 82 and to the cable attachment 90. The cable 78 is also mounted to the guiding rods 86 and 88 so as to extend along the first end element peripheral edge 40. For example, the cable 78 defines an end loop 91 received on the cable attachment 90, the latter taking the form of a rod extending perpendicularly from the first end element 22. Also, opposed to the end loop 91, the cable 78 is provided with an end member 92 secured thereto. The cable 78 extends through the mounting aperture 84 and the mounting aperture 84 is provided between the end member 92 and the loop 80.

In some embodiments of the invention, the end rod guide 76 includes a tensioner 94 operatively coupled to the cable 78 for providing a tension in the cable 78. For example, the tensioner 94 takes the form of a coil spring extending between the end member 92 and the mounting plate 82.

Referring to FIG. 1, in the specific embodiment of the invention shown in the drawings, the actuator 32 includes an actuating arm 96 defining an actuating arm first end 98 and an opposed actuating arm second end 100. The actuating arm 96 is pivotally mounted to the first end element 22 substantially adjacent the actuating arm first end 98. A motor 101, for example an electric motor, is mounted to the actuating arm 96 substantially adjacent the actuating arm second end 100. The motor 101 is operatively coupled to the end rod 36 to selectively rotate the end rod 36 relative to the actuating arm 96. A conventional controller (not shown in the drawings) and a conventional power source (not shown in the drawings) are provided to operate the motor 101.

The actuating arm 96 is articulated at a location intermediate the actuating arm first and second ends 98 and 100 so as to allow the end rod 36 to move along the first end element peripheral edge 40 as the motor 101 rotates the end rod 36 to move the tarpaulin 28 between the tarpaulin extended and retracted configurations. However, other types of actuating arms, such as a telescopic actuating arm could achieve the same functionality.

The operation of the system 10 is now described. First, the system 10 is installed to the vehicle platform. Then, with the tarpaulin 28 in the tarpaulin retracted configuration, the vehicle platform 12 is loaded. To facilitate this loading operation, the support arms 68 are pivoted upwardly by the arm biasing elements 74. Then, the motor 101 is used to unwind the tarpaulin 28 from the end rod 36, simply by turning the end rod 36. This operation also moves the loop 80 along the cable 78. During this operation, the cable 78 maintains the end rod 36 adjacent the first and second end elements 22 and 24, even in the presence of wind. Also, during this operation, the weight of the tarpaulin moves the support arms 68 to the arm extended position. The articulation of the actuating arm 96 allows for variations in the distance between the actuating arm first and second ends 98 and 100, so that the end rod 36 remains adjacent the first end member peripheral edge 40 for the entire process. When it is desired to remove the load from the vehicle platform 12, this operation is repeated in reverse. It should be noted that in the tarpaulin retracted configuration, the support member 38 is rolled along with the tarpaulin 28. When in the extended configuration, the support member 38 shapes the tarpaulin 28 so that the tarpaulin 28 matches the shape of the first and second end elements 22 and 24.

Figure 5:
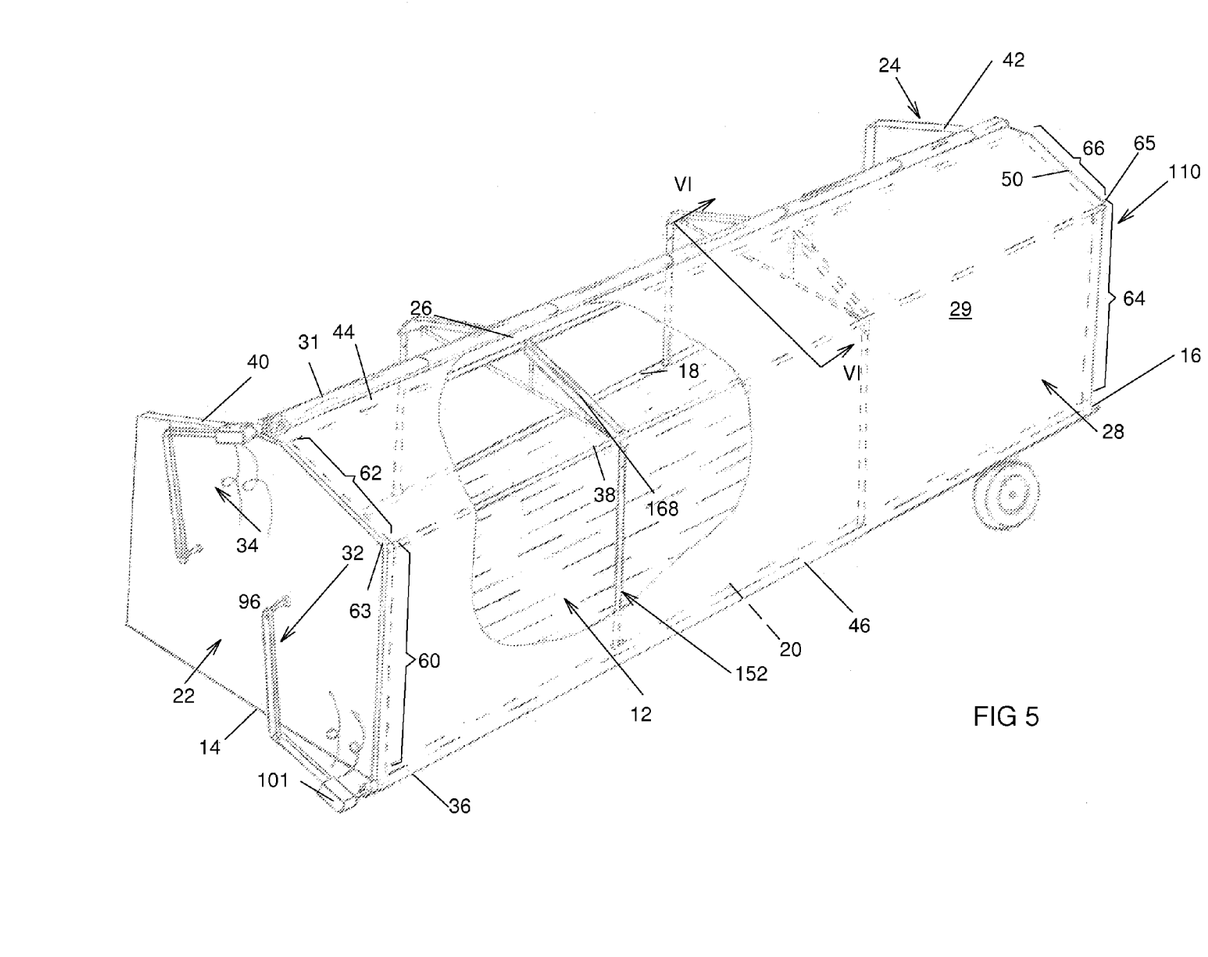
FIG. 5, in a perspective view, illustrates a system for covering at least part of a vehicle platform in accordance with another embodiment of the present invention.
Figures 6, 7:
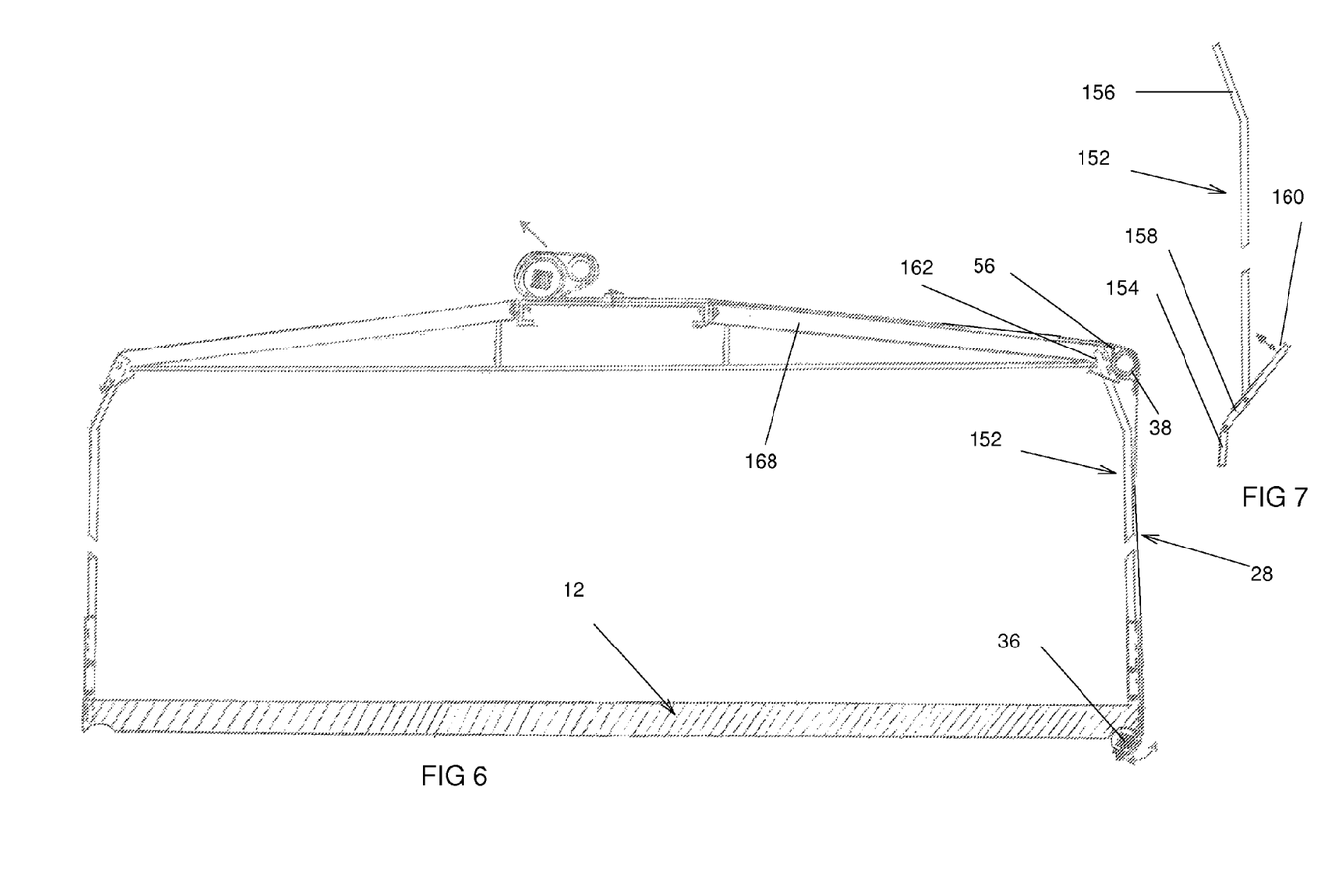

Referring to FIGS. 5 and 6, there is shows a system 110 in accordance with another embodiment of the present invention. The system 10 is similar to the system 110 and only the differences therebetween are described hereinbelow.

The system 110 includes a different type of attachment element support 152 and different support arms 168. The support arms 168 are fixed in a configuration similar to the arm extended position of the support arms 68. The support arms 168 are secured to the tarpaulin attachment element 26 at one end thereof and are supported by the attachment element supports 152 at the other end thereof.

The attachment element supports 152 are secured to the vehicle platform 12. For example, each attachment element supports 152 is inserted in a conventional sleeve (not shown in the drawings) located at the periphery of the vehicle platform 12. In some embodiments of the invention, the attachment element supports 152 are easily removable from the system 110. To that effect, as seen in in FIG. 7, each attachment element support 152 defines a support lower end section 154, an opposed support upper end section 156 and a support intermediate section 158 extending therebetween. The support intermediate section 158 is pivotally secured to the support lower end section 154 and support upper end section 156 at spaced apart locations therealong. Pivoting the support intermediate section 158 relative to the support lower end section 154 and support upper end section 156 changes a length of the attachment element supports 152. In some embodiments of the invention, a handle section 160 part of support intermediate section 158 protrudes from a portion of the support intermediate section 158 extending between the pivot attachment points with the support lower end section 154 and support upper end section 156.

By pivoting the support intermediate section 158 at an angle relative to the support lower end section 154 and support upper end section 156, the attachment element supports 152 can be inserted between the vehicle platform 12 and the support arms 168 or removed therefrom. To secure the attachment element supports 152 to the remainder of the system 110, the support intermediate section 158 is pivoted so as to be collinear with the support lower end section 154 and support upper end section 156, and the support upper end section 156 is inserted in a suitable recess 162 formed in the support arm 168.

Although the present invention has been described hereinabove by way of preferred embodiments thereof, it can be modified, without departing from the spirit and nature of the subject invention as defined in the appended claims.

What is claimed is:

1. A system for covering at least part of a vehicle platform, said vehicle platform defining a platform first end and a substantially opposed platform second end, said system comprising:
   a first end element mountable to said vehicle platform so as to extend substantially upwardly from said vehicle platform substantially adjacent said platform first end, said first end element defining a first end element peripheral edge;
   a second end element mountable to said vehicle platform so as to extend substantially upwardly from said vehicle platform substantially adjacent said platform second end, said second end element defining a second end element peripheral edge;
   a tarpaulin attachment element extending between said first and second end elements;
   a tarpaulin, said tarpaulin defining a tarpaulin movable end and a tarpaulin fixed portion extending in a substantially parallel and spaced apart relationship relative to each other, said tarpaulin also defining a pair of tarpaulin side edges extending between said tarpaulin fixed portion and movable end, said tarpaulin fixed portion being secured to said tarpaulin attachment element;
   an end rod mounted to said tarpaulin substantially adjacent said tarpaulin movable end and extending substantially parallel thereto;
   a support member extending substantially parallel to said end rod and mounted to said tarpaulin at a location intermediate said tarpaulin fixed portion and movable end; and
   an actuator operatively coupled to said end rod for selectively rolling said tarpaulin therearound and unrolling said tarpaulin therefrom, said actuator being operative for moving said tarpaulin between a tarpaulin retracted configuration and a tarpaulin extended configuration, wherein:
      in said tarpaulin retracted configuration, at least part of said tarpaulin is wound around said end rod and positioned adjacent said tarpaulin attachment element; and
      in said tarpaulin extended configuration, said tarpaulin is unwound from said end rod and said tarpaulin side edges extend each along at least part of a respective one of said first and second end element peripheral edges with said support member abutting against said first and second end elements.

2. A system as defined in claim 1, wherein
   said first end element peripheral edge defines a first edge first section extending from substantially adjacent said vehicle platform when said first end element is mounted to said vehicle platform in an operative configuration and a first edge second section extending from said first edge first section at an angle and laterally inwardly relative thereto;
   said second end element peripheral edge defines a second edge first section extending from substantially adjacent said vehicle platform when said second end element is mounted to said vehicle platform in an operative configuration and a second edge second section extending from said second edge first section at an angle and laterally inwardly relative thereto; and
   in said tarpaulin extended configuration, said support member abuts against said first and second end element peripheral edges respectively substantially adjacent a first merger of said first edge first and second sections and a second merger of said second edge first and second sections.

3. A system as defined in claim 2, wherein said first and second edge first sections are substantially vertical.

4. A system as defined in claim 1, wherein said support member protrudes from said tarpaulin side edges.

5. A system as defined in claim 1, wherein said tarpaulin attachment element extends between said first and second end elements overhanging said vehicle platform substantially in a middle of said vehicle platform when mounted to said vehicle platform in an operative configuration.

6. A system as defined in claim 5, further comprising at least one attachment element support mountable to said vehicle platform and to said tarpaulin attachment element for supporting said tarpaulin attachment element between said first and second end elements.

7. A system as defined in claim 5, further comprising at least one support arm defining an arm proximal end and a substantially opposed arm distal end, said support arm being movable between an arm retracted position and an arm extended position, wherein, with said system operatively mounted to said vehicle platform, in said arm extended position, said support arm extends laterally outwardly relative to said tarpaulin attachment element in an overhanging and substantially parallel relationship relative to said vehicle platform, said arm proximal end being substantially adjacent said tarpaulin attachment element, and, in said arm retracted position, said support arm is vertically pivoted relative to said arm extended position.

8. A system as defined in claim 7, further comprising an arm biasing element biasing said support arm towards said arm retracted position.

9. A system as defined in claim 8, wherein said arm biasing element exerts a biasing force on said support arm such that when said tarpaulin is in said tarpaulin extended configuration, said tarpaulin extends over said support arm and overcomes said biasing force so that said support arm achieves said arm extended position, and when said tarpaulin is in said tarpaulin retracted configuration, said biasing force moves said support arm to said arm retracted position.

10. A system as defined in claim 8, wherein said support arm is pivotally mounted to said tarpaulin attachment element substantially adjacent said arm proximal end, said arm biasing element including a coil torsion spring mounted to said support arm and to said tarpaulin attachment element.

11. A system as defined in claim 1, wherein said actuator includes an actuating arm and a motor, said actuating arm defining an actuating arm first end and an opposed actuating arm second end, said actuating arm being pivotally mounted to said first end element substantially adjacent said actuating arm first end, said motor being mounted to said actuating arm substantially adjacent said actuating arm second end and operatively coupled to said end rod to selectively rotate said end rod relative to said actuating arm.

12. A system as defined in claim 11, wherein said actuating arm is articulated at a location intermediate said actuating arm first and second ends so as to allow said end rod to move along said first end element peripheral edge as said electric motor rotates said end rod to move said tarpaulin between said tarpaulin extended and retracted configurations.

13. A system as defined in claim 1, wherein
said tarpaulin attachment element extends between said first and second end elements overhanging said vehicle platform substantially in a middle of said vehicle platform when mounted to said vehicle platform in an operative configuration;
said tarpaulin defines an other tarpaulin movable end, said tarpaulin fixed portion being provided substantially midway between said tarpaulin movable ends;
said system further comprises
an other end rod mounted to said tarpaulin substantially adjacent said other tarpaulin movable end and extending substantially parallel thereto;
an other support member extending substantially parallel to said other end rod and mounted to said tarpaulin at a location intermediate said tarpaulin fixed portion and said other tarpaulin movable end;
an other actuator operatively coupled to said other end rod for selectively rolling part of said tarpaulin therearound end unrolling said tarpaulin therefrom.

14. A system as defined in claim 1, further comprising an end rod guide for guiding said end rod along said first end element peripheral edge as said tarpaulin is moved between said tarpaulin extended and retracted configurations.

15. A system as defined in claim 14, wherein said end rod defines an end rod end section protruding from one of said tarpaulin side edges, said end rod guide including a cable extending along at least a portion of said first end element peripheral edge and forming a loop around said end rod end section.

16. A system as defined in claim 15, wherein said end rod end section defines an end rod groove extending circumferentially therearound and receiving said loop thereinto.

17. A system as defined in claim 15, wherein said end rod guide includes a tensioner operatively coupled to said cable for providing a tension in said cable.

18. A system as defined in claim 1, wherein said tarpaulin defines a sleeve extending between said tarpaulin side edges, said support member being received in said sleeve.

19. In combination, a vehicle platform and a system for covering at least part of said vehicle platform, said vehicle platform defining a platform first end and a substantially opposed platform second end, said system comprising:
a first end element mounted to said vehicle platform so as to extend substantially upwardly from said vehicle platform substantially adjacent said platform first end, said first end element defining a first end element peripheral edge;
a second end element mounted to said vehicle platform so as to extend substantially upwardly from said vehicle platform substantially adjacent said platform second end, said second end element defining a second end element peripheral edge;
a tarpaulin attachment element extending between said first and second end elements;
a tarpaulin, said tarpaulin defining a tarpaulin movable end and a tarpaulin fixed portion extending in a substantially parallel and spaced apart relationship relative to said tarpaulin movable end, said tarpaulin also defining a pair of tarpaulin side edges extending between said tarpaulin fixed portion and movable end, said tarpaulin fixed portion being secured to said tarpaulin attachment element;
an end rod mounted to said tarpaulin substantially adjacent said tarpaulin movable end and extending substantially parallel thereto;
a support member extending substantially parallel to said end rod and mounted to said tarpaulin at a location intermediate said tarpaulin fixed portion and movable end; and
an actuator operatively coupled to said end rod for selectively rolling said tarpaulin therearound and unrolling said tarpaulin therefrom, said actuator being operative for moving said tarpaulin between a tarpaulin retracted configuration and a tarpaulin extended configuration, wherein:
in said tarpaulin retracted configuration, at least part of said tarpaulin is wound around said end rod and positioned adjacent said tarpaulin attachment element; and
in said tarpaulin extended configuration, said tarpaulin is unwound from said end rod and said tarpaulin side edges extend each along at least part of a respective one of said first and second end element peripheral edges with said support member abutting against said first and second end elements.

* * * * *